United States Patent
Joo et al.

(10) Patent No.: US 7,854,913 B2
(45) Date of Patent: Dec. 21, 2010

(54) MESOPOROUS CARBON, METHOD OF PREPARING THE SAME, AND FUEL CELL USING THE CARBON

(75) Inventors: Sang-hoon Joo, Yongin-si (KR); Chan-ho Pak, Seoul (KR); Hyuk Chang, Seongnam-si (KR); Ji-man Kim, Suwon-si (KR); Hyung-ik Lee, Yongin-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 468 days.

(21) Appl. No.: 11/443,160

(22) Filed: May 31, 2006

(65) Prior Publication Data

US 2007/0116624 A1 May 24, 2007

(30) Foreign Application Priority Data

Nov. 22, 2005 (KR) .................. 10-2005-111974

(51) Int. Cl.
*B01J 19/08* (2006.01)
*H01M 8/00* (2006.01)
(52) U.S. Cl. .................. 423/445 R; 429/400
(58) Field of Classification Search .................. None
See application file for complete search history.

(56) References Cited

U.S. PATENT DOCUMENTS

| | | | | |
|---|---|---|---|---|
| 3,560,347 | A * | 2/1971 | Knapp et al. | 202/108 |
| 5,720,859 | A * | 2/1998 | Czubarow et al. | 204/157.43 |
| 6,228,803 | B1 | 5/2001 | Gadkaree et al. | |
| 6,251,822 | B1 | 6/2001 | Peng et al. | |
| 6,585,948 | B1 * | 7/2003 | Ryoo et al. | 423/445 R |
| 6,812,187 | B1 * | 11/2004 | Pak et al. | 502/180 |
| 7,811,959 | B2 | 10/2010 | Lee et al. | |
| 2005/0112451 | A1 | 5/2005 | Lee et al. | |

FOREIGN PATENT DOCUMENTS

| CN | 1281383 A | 1/2001 |
|---|---|---|
| CN | 1544321 A | 11/2004 |

(Continued)

OTHER PUBLICATIONS

Ryoo et al.; Ordered Mesoporous Carbons; Adv. Mater.; 13, pp. 677-681; 2001.*

(Continued)

*Primary Examiner*—Melvin C Mayes
*Assistant Examiner*—Guinever S Gregorio
(74) *Attorney, Agent, or Firm*—Lee & Morse, P.C.

(57) ABSTRACT

A mesoporous carbon is prepared by mixing a carbon precursor, an acid, and a solvent to obtain a carbon precursor mixture; impregnating an ordered mesoporous silica (OMS) with the carbon precursor mixture; carbonizing the impregnated OMS at 800 to 1300° C. by irradiating microwave energy with a power of 100 to 2000 W thereon to form an OMS-carbon composite; and removing the mesoporous silica from the OMS-carbon composite. The method of preparing a mesoporous carbon can significantly reduce a carbonization time by carbonizing a carbon precursor using microwave energy in a silica template compared to a conventional method using a heat treatment. A supported catalyst and a fuel cell include the mesoporous carbon.

20 Claims, 7 Drawing Sheets

ORDERED MESOPOROUS SILICA (OMS) TEMPLATE → MICROWAVE IRRADIATION → OMS-CARBON COMPOSITE → ORDERED MESOPOROUS CARBON

FOREIGN PATENT DOCUMENTS

| | | | |
|---|---|---|---|
| CN | 1617372 A | | 5/2005 |
| JP | 51033795 A | * | 9/1974 |
| JP | 3-75210 | | 3/1991 |
| JP | 2002-146635 A | | 5/2002 |
| JP | 2002-161278 | | 6/2002 |
| JP | 2005-154268 | | 6/2005 |
| KR | 1996-10569 | | 4/1996 |
| KR | 1996-33702 | | 10/1996 |
| KR | 2002/23522 | | 3/2002 |
| KR | 2004-42142 | | 5/2004 |
| WO | WO 99/39818 A1 | | 8/1999 |
| WO | WO 03/067931 A1 | | 8/2003 |

OTHER PUBLICATIONS

Cundy; Microwave Techniques in the Synthesis and Modification of Zeolite Catalysts. A Review; Collect. Czech. Chem. Commun; vol. 63, pp. 1699-1723; 1998.*

Ryoo et al.; Synthesis of Highly Ordered Carbon Molecular Sieves via Template-Mediated Structural Transformation; The Journal of Physical Chemistry B; vol. 103, No. 37, pp. 7743-7746; 1999.*

Derwent Abstract for JP 51033795 A.*

Office Action issued by the Chinese Patent Office in Chinese Patent Application No. 2006100876482 on Jul. 3, 2009.

Office Action issued by the Japanese Patent Office in Japanese Patent Application No. 2006-155429 on Jun. 16, 2009.

Nam et al., *Direct methanol fuel cell Pt-carbon catalysts by using SBA-15 nanoporous templates*. Electrochem Commun., NL, 2004, vol. 6, No. 7, p. 737-741.

Joo et al., *Synthesis of ordered mesoporous carbon molecular sieves CMK-1*, Mesoporous and Mesoporous Materials, NL, 2001, vol. 44/45, p. 153-158.

Joo et al., *Ordered nanoporous arrays of carbon supporting high dispersions of platinum nanoparticles*, Nature, vol. 412, 2001, p. 169-172.

* cited by examiner

MESOPOROUS CARBON, METHOD OF PREPARING THE SAME, AND FUEL CELL USING THE CARBON

CROSS-REFERENCE TO RELATED APPLICATION

This application claims the benefit of Korean Patent Application No. 2005-111974, filed on Nov. 22, 2005, in the Korean Intellectual Property Office, the disclosure of which is incorporated herein in its entirety by reference.

BACKGROUND OF THE INVENTION

1. Field of the Invention

Aspects of the present invention relate to mesoporous carbon, a method of preparing the same and a fuel cell using the carbon, and more particularly, to a method of preparing mesoporous carbon in which a carbonization process is performed using microwave energy in a mesoporous silica template. With this method, the carbonization time is significantly reduced. Aspects of the present invention further relate to mesoporous carbon obtained according to the method, and a fuel cell using the mesoporous carbon as a catalyst support.

2. Description of the Related Art

A catalyst contained in fuel cell electrodes plays an important role by facilitating electrochemical reactions. Therefore, it is beneficial to increase the activity of catalysts used in electrodes. Since the activity of a catalyst increases as the reaction surface area of the catalyst increases, catalyst particles should be reduced in the diameter to increase the reaction surface area and should be uniformly distributed in an electrode. A catalyst support should also have a high surface area, and much research has been carried out on ways to increase the surface area of catalyst supports. Further, in addition to a high surface area, which may be obtained through high porosity, a support for a fuel cell catalyst must also have sufficient electrical conductivity so that the support can act as a path for the flow of electrons. A conventional example of such a support is an amorphous microporous carbon powder, such as activated carbon or carbon black.

However, it is known that micropores of these types of amorphous microporous carbon particles are poorly connected. Therefore, in a conventional direct methanol fuel cell (DMFC), a supported catalyst that is prepared using an amorphous microporous carbon powder support exhibits much lower reactivity than does a metal particle used by itself as a catalyst.

However, when a metal particle is used by itself as a catalyst, the amount of the catalyst required is greater, and thus, the manufacturing costs of a DMFC increase. Accordingly, the development of a supported catalyst that can improve catalyst activity is urgently required.

SUMMARY OF THE INVENTION

Aspects of the present invention provide a method of preparing a mesoporous carbon which has a good sheet resistance and significantly reduces a carbonization time, and a mesoporous carbon prepared according to the method.

Aspects of the present invention also provide a supported catalyst containing the mesoporous carbon and a fuel cell having improved efficiency by using the supported catalyst.

According to an aspect of the present invention, there is provided a method of preparing a mesoporous carbon, the method including: mixing a carbon precursor, an acid, and a solvent to obtain a carbon precursor mixture; impregnating an ordered mesoporous silica (OMS) with the carbon precursor mixture; carbonizing the impregnated OMS at 900 to 1500° C. by irradiating the impregnated OMS with microwave energy with a power of 400 to 1200 W to form an OMS-carbon composite; and removing the mesoporous silica from the OMS-carbon composite.

According to another aspect of the present invention, there is provided a mesoporous carbon having mesopores prepared according to the method described above.

According to yet another aspect of the present invention, there is provided a supported catalyst including: the mesoporous carbon prepared according to the method described above; and metal catalyst particles that are supported on the mesoporous carbon.

According to still another aspect of the present invention, there is provided a fuel cell including: a cathode; an anode; and an electrolyte membrane interposed between the cathode and the anode, wherein at least one of the cathode and the anode contains the mesoporous carbon prepared according to the method describe above, and/or that contains the supported catalyst.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

The present invention significantly reduces a carbonization time when synthesizing mesoporous carbon by carbonizing a carbon precursor in a silica template using microwave energy.

As used herein, the term "microwave" refers to a region of electronic spectrum having a frequency of 30 GHz to 300 MHz which corresponds to a wavelength of 1 cm to 1 m. This region is also called the ultrahigh frequency region. A household or industrial microwave heater should be operated at a wavelength of 12.2 cm (corresponding to a frequency of 2.45 GHz) or at a wavelength of 33.3 cm (corresponding to a frequency of 918 MHz) not to interfere with the wavelength used for radar. Thus, in an exemplary embodiment of the present invention, the term "microwave" includes such a specific wavelength. Conventional microwave equipment can be used in the method according to an aspect of the present embodiment.

In an embodiment of the present invention, microwave equipment having a power of 2 kW or less operated at a frequency of 2.45 gHz may be used.

Figure 1:
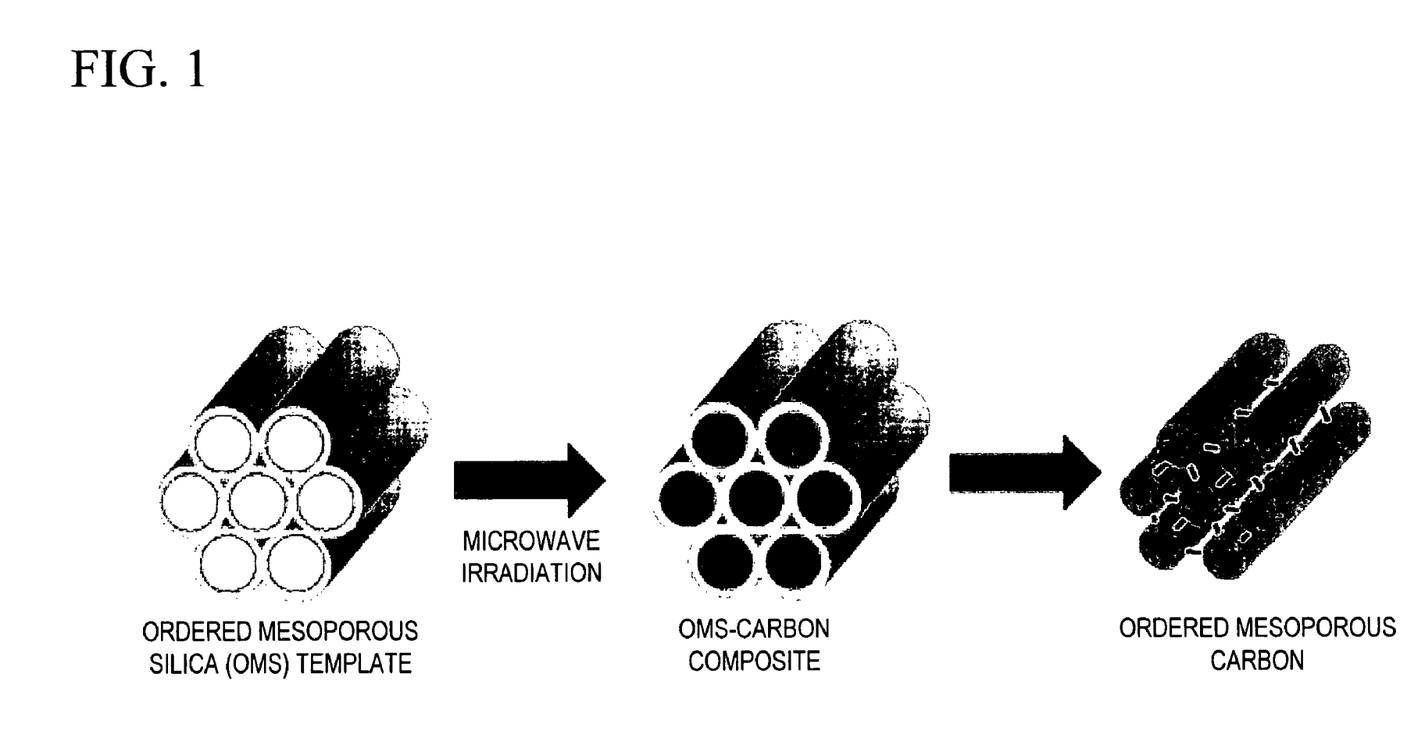
FIG. 1 schematically illustrates a method of forming a mesoporous carbon according to an embodiment of the present invention.

FIG. 1 schematically illustrates a process of forming mesoporous carbon according to an embodiment of the present invention.

Referring to FIG. 1, a carbon precursor is introduced into an ordered mesoporous silica (OMS) template, and a carbonization process is performed thereon using microwave energy to form an OMS-carbon composite. The OMS has an X-ray diffraction peak of 2 degrees or less due to regularly arranged pores.

Then, the OMS is removed from the OMS-carbon composite so that what remains is an ordered mesoporous carbon (OMC) material.

Figure 2:
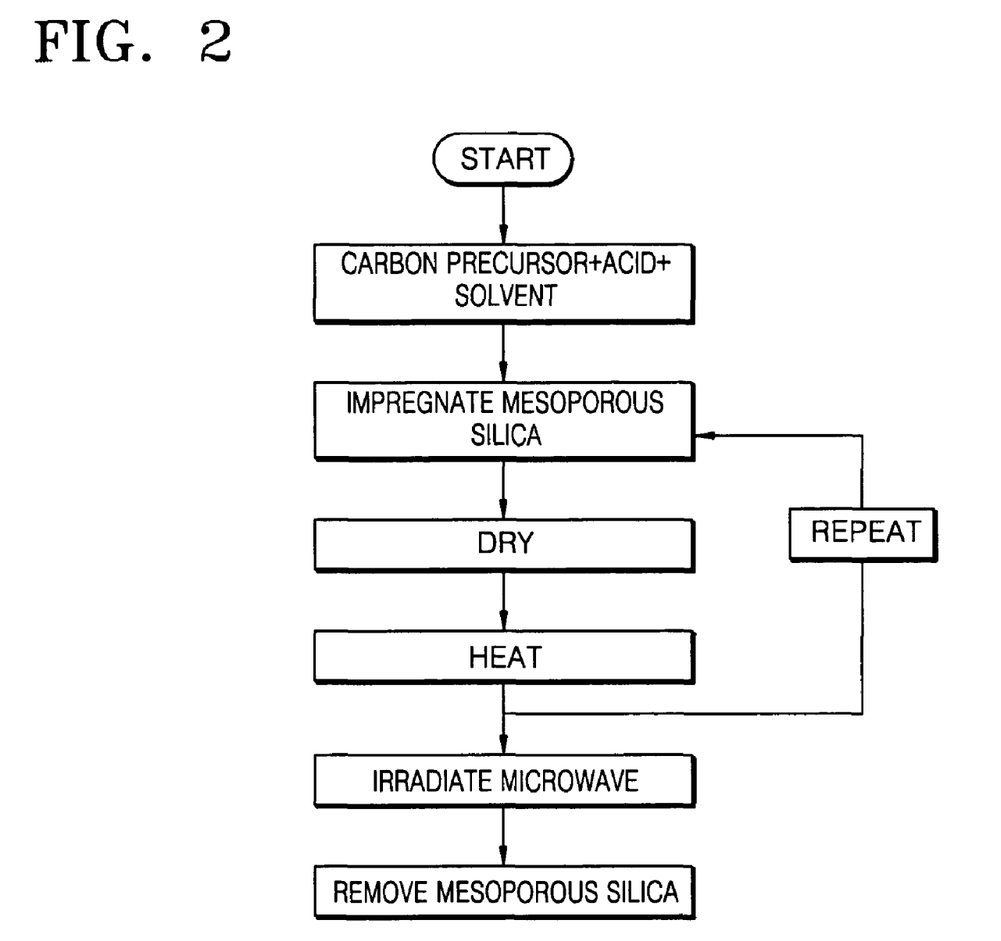
FIG. 2 is a flow chart illustrating a method of preparing a mesoporous carbon according to an embodiment of the present invention.

The method of preparing mesoporous carbon according to an embodiment of the present invention will now be described in detail with reference to FIG. 2.

A carbon precursor, an acid, and a solvent are mixed to obtain a carbon precursor mixture.

Non-limiting examples of the carbon precursor include carbohydrates including sucrose, furfuryl alcohol, divinylbenzene, phenol-formaldehyde, resorcinol-formaldehyde, aromatic compounds such as phenanthrene and anthracene. The acid that is used for preparing the carbon precursor mixture may be an organic acid or an inorganic acid. Non-limiting examples of the acid include sulfuric acid, nitric acid, phosphoric acid, and p-toluene sulfonic acid.

The solvent that is used for preparing the precursor mixture may be any solvent that can uniformly disperse the carbon precursor. More particularly, as non-limiting examples, the solvent may be water, acetone, methanol, ethanol, isopropylalcohol, n-propylalcohol, butanol, dimethylacetamide, dimethylformamide, dimethylsulfoxide, N-methyl-2-pyrrolidone, tetrahydrofuran, tetrabutylacetate, n-butylacetate, m-cresol, toluene, ethyleneglycol, γ-butyrolactone, hexafluoroisopropanol (HFIP), or the like. These materials can be used alone or in combination.

The amount of the carbon precursor may be in the range of 5 to 15 parts by weight based on 100 parts by weight of the entire precursor mixture. When the amount of the carbon precursor is less than 5 parts by weight based on 100 parts by weight of the entire precursor mixture, it is difficult to form the mesoporous carbon. When the amount of the carbon precursor is greater than 15 parts by weight based on 100 parts by weight of the entire precursor mixture, it is difficult to dissolve the carbon precursor in the solvent, and particles are likely to become agglomerated such that the surface area of the mesoporous carbon decreases.

The amount of the acid may be in the range of 10 to 35 parts by weight based on 100 parts by weight of the entire precursor mixture. When the amount of the acid is less than 10 parts by weight based on 100 parts by weight of the entire precursor mixture, generation of a mesoporous carbon is not facilitated. When the amount of the acid is greater than 35 parts by weight based on 100 parts by weight of the entire precursor mixture, formation of a carbon material is facilitated even outside the mesoporous silica, and thus, the degree of order is reduced.

The amount of the solvent may be in the range of 55-80 parts by weight based on 100 parts by weight of the entire precursor mixture. When the amount of the solvent is less than 55 parts by weight based on 100 parts by weight of the entire precursor mixture, the precursor may be insufficiently dissolved in the solvent. When the amount of the solvent is greater than 80 parts by weight based on 100 parts by weight of the entire precursor mixture, particles are very likely to become agglomerated.

The weight ratio of the carbon precursor to the acid may be in range of 1:2.5 to 1:3.5. As a non-limiting example, the weight ratio of the carbon precursor to the acid may be in the range of 1:2.7 to 1:3.3. When the weight ratio of the carbon precursor to the acid is within this range, the carbon precursor harmoniously reacts with the acid so that the mesoporous carbon may be easily produced.

An ordered mesoporous silica (OMS) is impregnated with the precursor mixture prepared above. Then, the impregnated OMS is dried, heat treated, and carbonized using microwave energy to form an OMS-carbon composite.

The mesoporous silica may be a molecular sieve material structured such that one-dimensional pores are mutually connected by micropores, but the OMS material is not limited thereto. More particularly, as non-limiting example, the mesoporous silica may be MCM-48, which has a cubic structure, SBA-1, which has a different cubic structure, SBA-15, which has a hexagonal structure, KIT-1, MSU-1, or the like, which may have a disordered or irregularly connected three-dimensional connection structure. Furthermore, the mesoporous silica may be any type of a molecular sieve material that contains any type of mesoporous material structured such that one-dimensional pores are mutually connected by micropores.

The amount of the mesoporous silica that is impregnated with the precursor mixture may be in the range of 5 to 15 parts by weight based on 100 parts by weight of the precursor mixture. When the amount of the mesoporous silica is less than 5 parts by weight, the relative amount of the precursor mixture is too high. As a result, after impregnation, particles are very likely to be agglomerated so that the surface area of the mesoporous carbon is lessened. When the amount of the mesoporous silica is greater than 15 parts by weight, the relative amount of the precursor mixture is too low such that a carbon structure is not sufficiently formed in the silica pores.

The impregnating temperature is not particularly limited, but may be room temperature.

If necessary, the mesoporous silica that has been impregnated with the precursor mixture as described above may be dried. The drying temperature is not particularly limited, but may be room temperature. In addition, for quick drying, the drying process may be performed under reduced pressure.

The impregnated OMS may then be heat treated. The heat treatment may be performed at 50 to 250° C. When the heat treatment temperature is lower than 50° C., the structure of the mesoporous carbon may be formed inappropriately. When the heat treatment temperature is higher than 250° C., the uniformity of the mesoporous carbon to be formed may decrease. Alternatively, the heat treatment may be divided into a first heat treatment and a second heat treatment. For example, the first heat treatment may be performed at about 50° C. to about 150° C., and the second heat treatment may be performed at about 150° C. to about 250° C. Through the heat treatment, a mesoporous carbon structure is formed, and the liquid solvent and other volatile liquids contained in the precursor mixture are completely removed.

The mesoporous carbon may be prepared by impregnating an OMS material, heat-treating the impregnated OMS material and then directly carbonizing the heat-treated impregnated OMS material as described below. However, if the impregnation and heat-treatment is carried out only once, there is a possibility that the carbon structure may be incompletely formed in the mesoporous silica pores. Accordingly, before the impregnated OMS material is carbonized, cycles of impregnating and heat treating may be repeatedly performed to ensure a complete formation of a carbon structure in the mesoporous silica pores. However, repetition of the impregnation and the heat treatment more than 10 times is unnecessary because the satisfactory results can be obtained with fewer repetitions.

As described above, the carbon structure that is obtained by impregnating the OMS material with the precursor mixture and heat-treating the impregnated OMS material is carbonized to obtain an ordered mesoporous carbon structure. The carbon precursor that is impregnated into the mesoporous silica becomes graphitized through the carbonization, and the mesoporous silica acts as a template to provide the carbonized material with an ordered structure. The carbonization may be achieved by, for example, irradiating microwave energy onto the heat-treated impregnated OMS material to provide heating at 800° C. to 1300° C.

The power of microwave energy may be 100-2000 W, preferably 400-1200 W, more preferably 500-800 W. The irradiation time of the microwave energy may be 1-180 minutes, preferably 5-60 minutes. When the power of microwave energy is less than 100 W, it is difficult to form a carbon backbone due to insufficient carbonization, and when the power of the microwave energy is greater than 2000 W, the backbone of the silica template is destroyed, and thus, the structural uniformity of the formed carbon may be insufficient when the silica template is removed.

When the irradiation time of microwave energy is less than 1 minute, it is difficult to form a carbon backbone due to insufficient carbonization and when the irradiation time of microwave energy is greater than 180 minutes, the backbone of the silica template may be destroyed, and thus the structural uniformity of the formed carbon may be insufficient when the silica template is removed.

When the carbonizing temperature is lower than 800° C., carbonization occurs incompletely and thus, the degree of order in the produced material may be incomplete. When the carbonizing temperature is higher than 1300° C., carbon may thermally decompose or the structure of the mesoporous silica acting as the template may be deformed.

The carbonization may be performed in a non-oxidation atmosphere. The non-oxidation atmosphere may be selected from a vacuum atmosphere, a nitrogen atmosphere, and an inert gas atmosphere.

Then, the mesoporous silica is removed from the OMS-carbon composite by using a solvent that can selectively dissolve the mesoporous silica.

The solvent that can selectively dissolve the mesoporous silica may include, for example, an aqueous HF solution or an aqueous NaOH solution. The concentration of the aqueous HF solution may be 5-47 wt % and the concentration of the aqueous NaOH solution may be 5-30 wt %.

It is well known that mesoporous silica becomes a water-soluble silicate through alkali melting or carbonate dissociation and reacts with HF to form $SiF_4$, which easily erodes. By removing the mesoporous silica, the ordered mesoporous carbon can be separated.

The mesoporous carbon obtained according to an aspect of the present invention may be an ordered mesoporous carbon in which pores are regularly arranged.

While a conventional amorphous microporous carbon powder includes micropores only, the mesoporous carbon according to an embodiment of the present invention includes mesopores as well as micropores in a proper ratio. Herein, according to the International Union of Pure and Applied Chemistry (IUPAC), a micropore is defined as a pore of about 2 nm or less in diameter, and a mesopore is defined as a pore of about 2 to 50 nm in diameter.

The average diameter of the mesopores of the mesoporous carbon according to an embodiment of the present invention may be in the range of 2 to 10 nm. The mesoporous carbon according to an embodiment of the present invention has a specific surface area of 200-2000 $m^2/g$ and a sheet resistance of 20-200 $m\Omega/cm^2$ or less, which is measured using a 4-point probe method at a pressure of 75.4±3.0 $kg_f/cm^2$. The sheet resistance of the mesoporous carbon according to an embodiment of the present invention is much lower than that of the conventional mesoporous carbon.

When the average diameter of the pores is less than 2 nm, supply of a fuel may not occur smoothly and the activity of the catalyst may be limited. When the average diameter of the mesopores is greater than 10 nm, catalyst particles easily increase in size when the catalyst is produced, and thus, the efficiency of the catalyst decreases.

When the specific surface area of the mesoporous carbon is less than 200 $m^2/g$, it is difficult to provide sufficient dispersion of catalyst particles to be loaded onto the mesoporous carbon. When the specific surface area of the mesoporous carbon is greater than 2000 $m^2/g$, limitation of fuel or mass transfer occurs because of too many micropores, and thus, the efficiency of the catalyst decreases.

Since pores in the mesoporous carbon of the present embodiment are regularly arranged, a main peak appears for $2\theta$ between 0.5° and 2° at a CuK-$\alpha$ X-ray wavelength of 1.541 Å.

A supported catalyst that contains the mesoporous carbon acting as a support will now be described in detail.

A supported catalyst according to an embodiment of the present invention includes the mesoporous carbon as described above and metal catalyst particles that are distributed and supported on the mesoporous carbon. The metal catalyst particles are distributed and supported on the surface or in pores of the mesoporous carbon.

The metal catalyst that can be used in the supported catalyst according to an embodiment of the present invention is not particularly limited. As non-limiting examples, the metal catalyst may be Ti, V, Cr, Mn, Fe, Co, Ni, Cu, Zn, Al, Mo, Se, Sn, Pt, Ru, Pd, W, Ir, Os, Rh, Nb, Ta, Pb, Bi, or a combination of these.

A suitable metal catalyst may vary according to a reaction to which the supported catalyst according to an embodiment of the present invention is to be subjected. In addition, the metal catalyst may be a single metal or an alloy of two or more metals.

More particularly, when the supported catalyst according to an embodiment of the present invention is used in a catalyst layer of a cathode or an anode of a fuel cell, such as a phosphoric acid fuel cell (PAFC) or a proton exchange membrane fuel cell (PEMFC), Pt can be used as the metal catalyst. In another embodiment, the supported catalyst may be used in a catalyst layer of an anode of a direct methanol fuel cell (DMFC), in which case, an alloy of Pt and Ru may be used as the metal catalyst. In this case, the atomic ratio of Pt to Ru may be, in general, in the range of about 0.5:1 to about 2:1. In yet another embodiment, the supported catalyst may be used in a catalyst layer of a cathode of a DMFC, in which case, Pt may be used as the metal catalyst.

When the average particle size of the metal catalyst particles is too small, the catalyst reaction may not be facilitated. On the other hand, when the average particle size of the metal catalyst particles is too large, the reaction surface area of the entire catalyst particle is reduced and thus, the efficiency of the supported catalyst may be reduced. In consideration of these problems, the average particle size of the metal catalyst particle may be in the range of about 1 nm to about 5 nm.

When the amount of the metal catalyst contained in the supported catalyst is too small, metal catalyst may have little effect when applied to a fuel cell. When the amount of the metal catalyst particle contained in the supported catalyst is too large, the manufacturing costs may increase and the catalyst particle size may increase. In consideration of these problems described above, the amount of the metal catalyst contained in the supported catalyst may be in the range of 40 to about 80 parts by weight based on 100 parts by weight of the supported catalyst.

The supported catalyst according to an embodiment of the present invention can be formed using various known methods of producing a supported catalyst. For example, the supported catalyst according to an embodiment of the present invention may be formed by impregnating a support with a metal catalyst precursor solution and reducing the impregnated metal catalyst precursor. The method of producing a supported catalyst is described in various references in detail and thus will not be described herein in detail.

A fuel cell according to an embodiment of the present invention will now be described in detail.

The fuel cell according to an embodiment of the present invention includes a cathode, an anode, and an electrolyte membrane interposed therebetween. At least one of the cathode and the anode includes the supported catalyst according to an embodiment of the present invention described above.

The fuel cell according to an embodiment of the present invention may be, for example, a PAFC, a PEMFC, or a DMFC. The structures of these fuel cells and methods of manufacturing them are not particularly limited and are described in detail in various references. Accordingly, the structure and manufacturing method of the fuel cell will not be described herein in detail.

The present invention will be described in further detail with reference to the following examples. These examples are for illustrative purposes only and are not intended to limit the scope of the present invention.

EXAMPLE 1

Preparation of Mesoporous Carbon 2.3 g of sucrose and 0.25 g of sulfuric acid were completely dissolved in 6.6 mL of water to prepare a homogeneous carbon precursor mixture. The carbon precursor mixture was divided into two parts in a weight ratio of 60:40. 1 g of SBA-15, an ordered mesoporous silica (OMS) material, was impregnated with the larger solution. The impregnated SBA-15 was dried in a hood at room temperature for 30 minutes, and then dried at 160° C. for 2 hours.

The dried result was impregnated with the remaining solution, and dried in the same manner as above.

The dried sample was cooled to room temperature, and then irradiated with microwave energy having a power of 570 W under a nitrogen atmosphere for 1 hour to heat to about 900° C., thereby performing carbonization.

The carbonized material was added to a mixed solution of HF, water and ethanol and then stirred. The adding and stirring processes were repeated to remove the SBA-15, leaving behind a mesoporous carbon material.

EXAMPLE 2

A mesoporous carbon was prepared in the same manner as in Example 1 except that microwave energy having a power of 500 W was used instead of microwave energy having a power of 570 W.

EXAMPLE 3

A mesoporous carbon was prepared in the same manner as in Example 1 except that microwave energy having a power of 850 W was used instead of microwave energy having a power of 570 W.

EXAMPLE 4

A mesoporous carbon was prepared in the same manner as in Example 1 except that microwave energy having a power of 1180 W was used instead of microwave energy having a power of 570 W.

EXAMPLE 5

A mesoporous carbon was prepared in the same manner as in Example 1 except that the carbonization process was performed at about 1200° C. through microwave irradiation.

COMPARATIVE EXAMPLE 1

A mesoporous carbon was prepared in the same manner as in Example 1 except that the dried sample was cooled to room temperature, slowly heated to 200° C. for 1 hour, maintained at the same temperature for 6 hours, slowly heated to 900° C. for 4 hours, and maintained at the same temperature for 2 hours, thereby performing carbonization without using microwave energy.

COMPARATIVE EXAMPLE 2

A mesoporous carbon was prepared in the same manner as in Example 1 except that microwave energy having a power of 2050 W was used instead of microwave having a power of 570 W.

COMPARATIVE EXAMPLE 3

A mesoporous carbon was prepared in the same manner as in Example 1 except that a carbonization process was performed at about 1500° C. through microwave irradiation.

Figure 3:
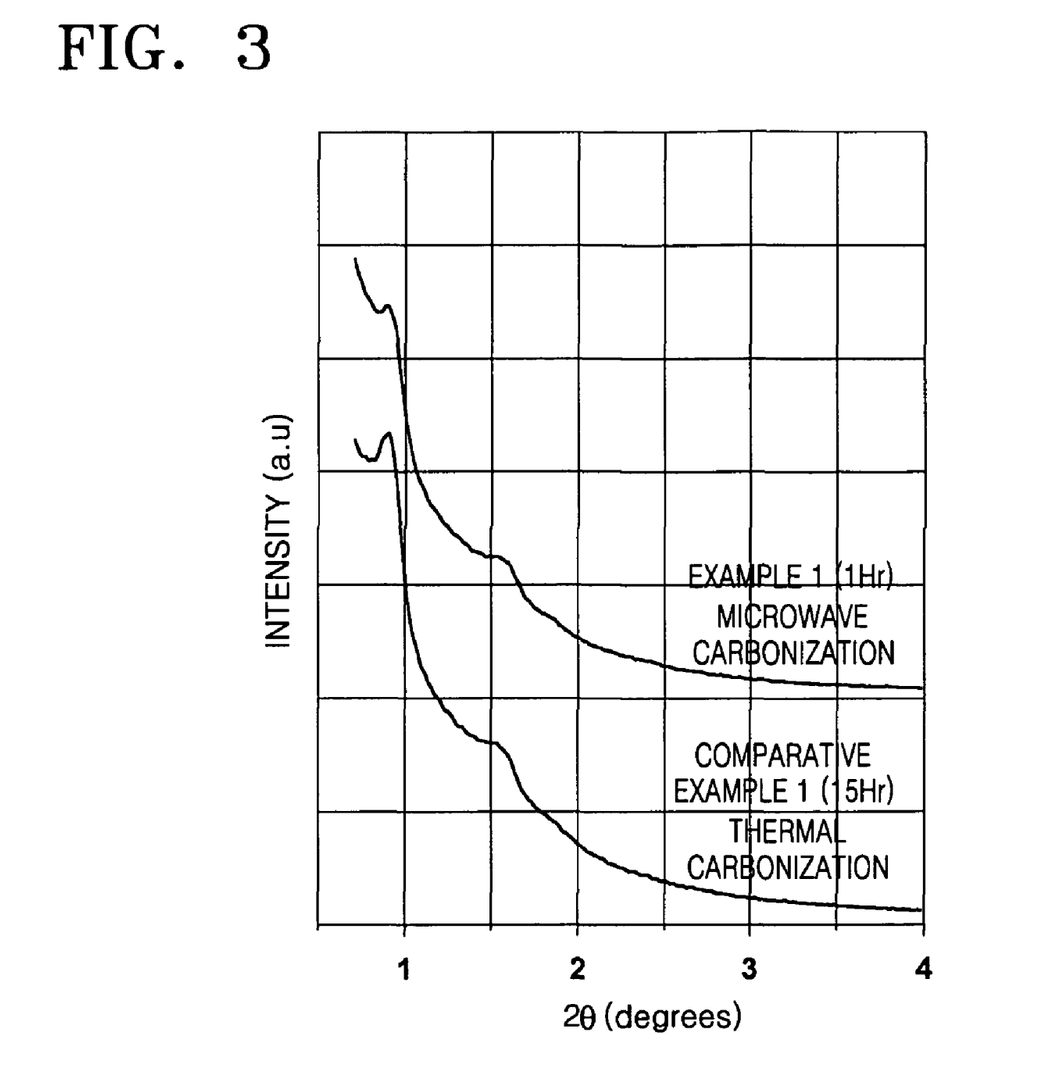
FIG. 3 is a graph illustrating the results of an X-ray diffraction analysis on mesoporous carbons prepared in Example 1 and Comparative Example 1.

FIG. 3 illustrates the results of the X-ray diffraction analysis on mesoporous carbons prepared in Example 1 and Comparative Example 1.

Referring to FIG. 3, the mesoporous carbon synthesized through microwave carbonization exhibits a structural uniformity similar to the mesoporous carbon prepared though carbonization using a general electric furnace.

Figure 4:
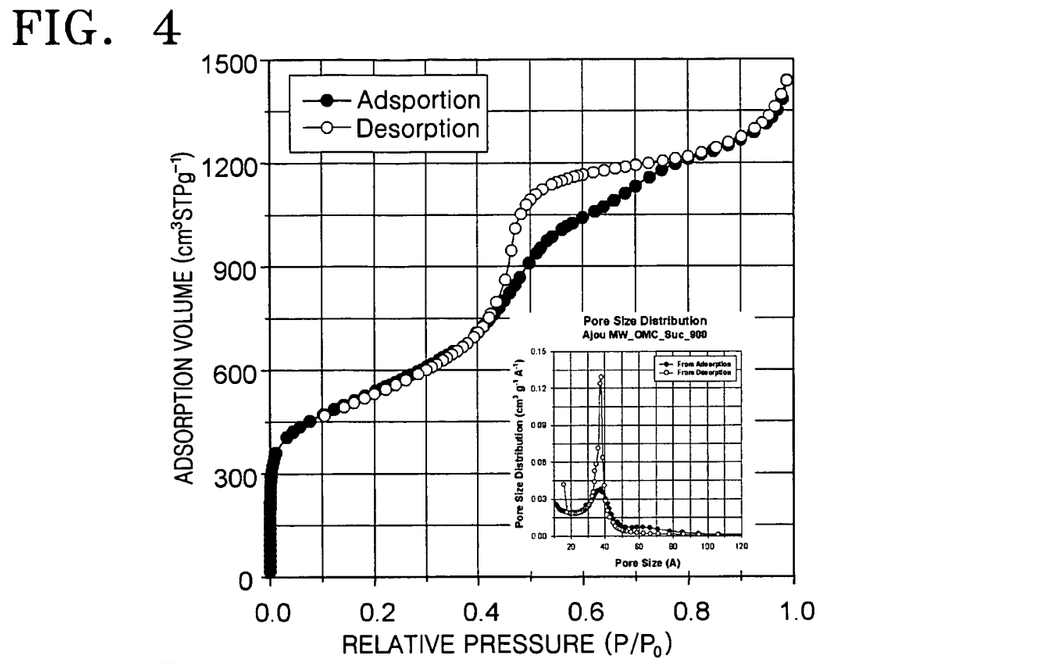
FIGS. 4 and 5 illustrate nitrogen adsorption-desorption curves of mesoporous carbons prepared in Example 1 and Comparative Example 1.
Figure 5:
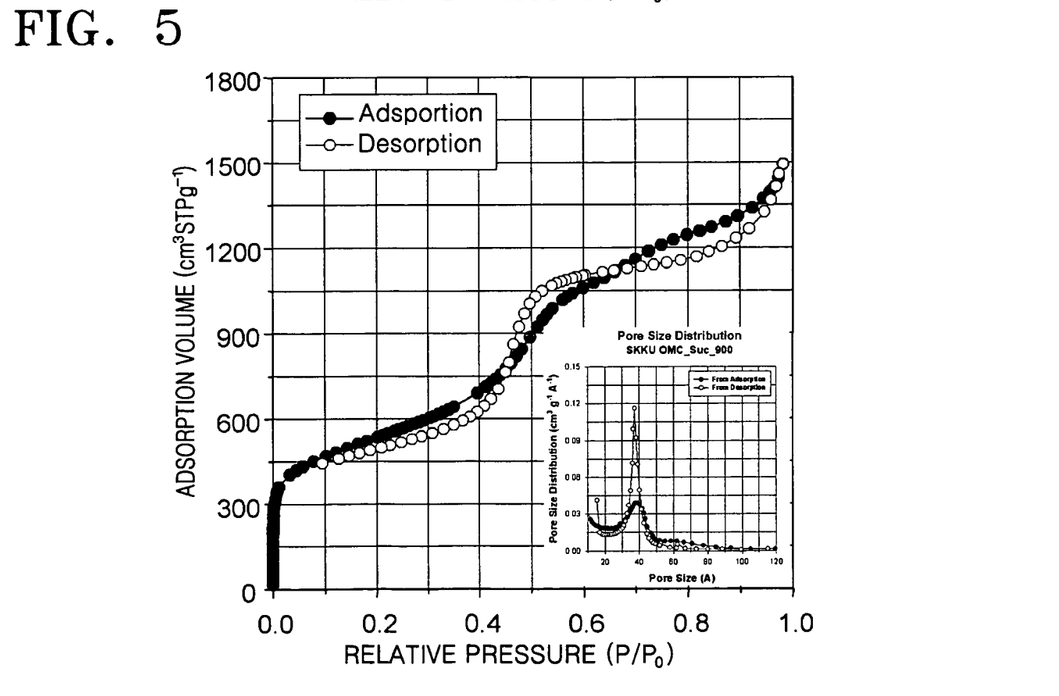

FIGS. 4 and 5 illustrate nitrogen adsorption-desorption curves of mesoporous carbons prepared in Example 1 and Comparative Example 1. The BET surface area of mesoporous carbons prepared in Example 1 and Comparative Example 1 can be determined on the basis of curves of FIGS. 4 and 5.

Referring to FIGS. 4 and 5, mesoporous carbons prepared in Example 1 (shown in FIG. 4) and Comparative Example 1 (shown in FIG. 5) have similar BET surface areas and pore sizes.

Figure 6:
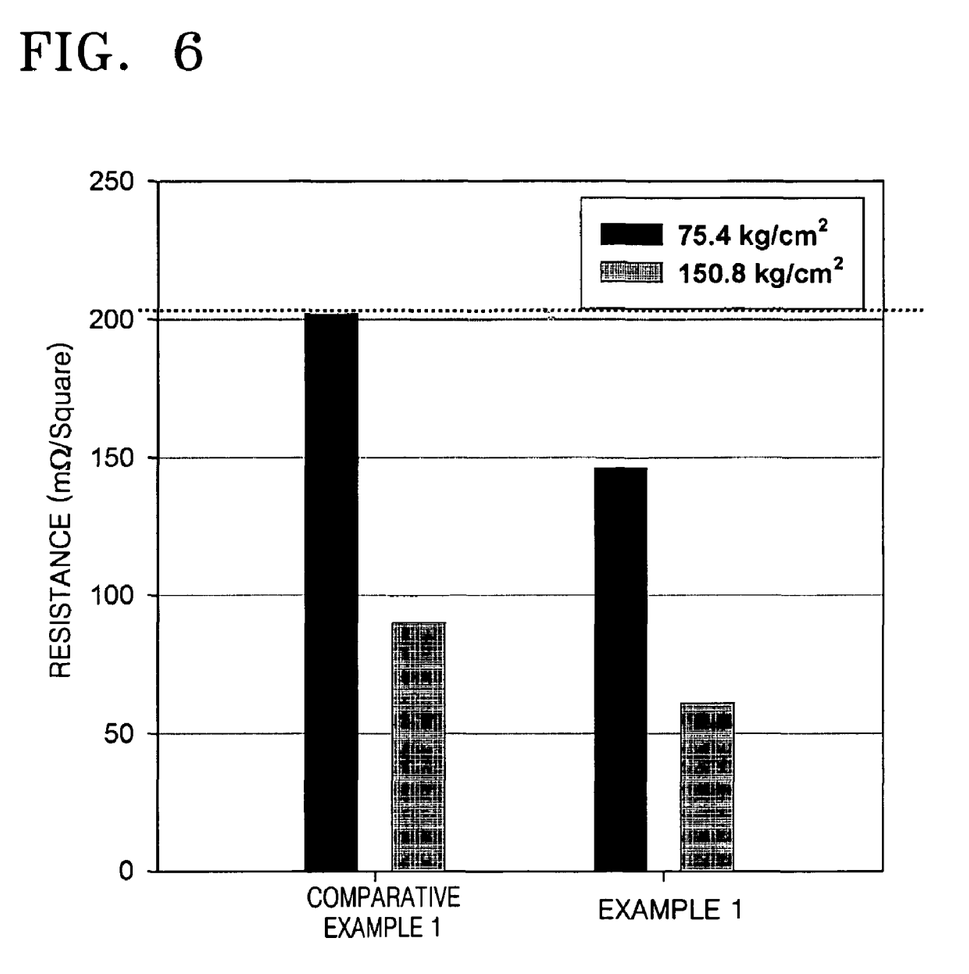
FIG. 6 illustrates the results of measuring the sheet resistance of mesoporous carbons prepared in Example 1 and Comparative Example 1.

FIG. 6 illustrates the results obtained by measuring the sheet resistance of mesoporous carbons prepared in Example 1 and Comparative Example 1. Herein, the sheet resistance was measured as follows.

The sheet resistance of mesoporous carbons of Example 1 and Comparative Example 1 was measured using a 4-point probe method. 50 mg of each of the mesoporous carbons of Example 1 and Comparative Example 1 was placed in a sheet resistance measurement system (CMT series, Changmintech) and the sheet resistance was measured while applying pressures of 75.4 $kg_f/cm^2$ and 150.7 $kg_f/cm^2$ thereto. The sheet resistance measurement system included 4 electrodes, i.e., a pair of electrodes for measuring the voltage and a pair of electrodes for measuring a current at the bottom of a chamber containing a material to be measured.

Referring to FIG. 6, the mesoporous carbon of Example 1 has a much lower sheet resistance than the mesoporous carbon of Comparative Example 1.

Figure 7:
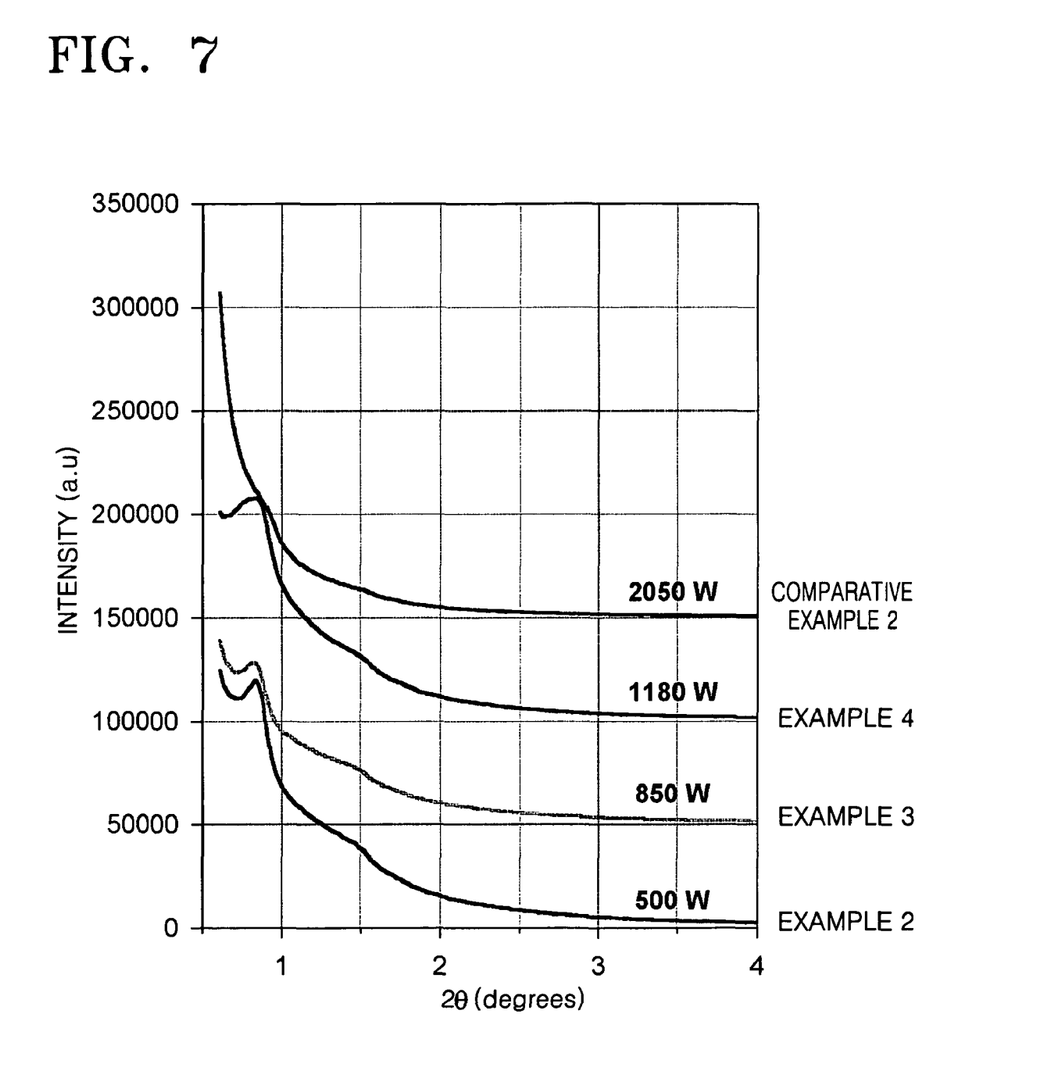
FIG. 7 is a graph illustrating the results of an X-ray diffraction analysis on mesoporous carbons prepared using various microwave powers according to Examples 2-4 and Comparative Example 2.

FIG. 7 is a graph illustrating the results of an X-ray diffraction analysis on mesoporous carbons prepared using various microwave powers according to Examples 2-4 and Comparative Example 2.

Referring to FIG. 7, as the microwave power irradiated during a carbonization process increases, regularity of finally obtained carbon decreases.

Figure 8:
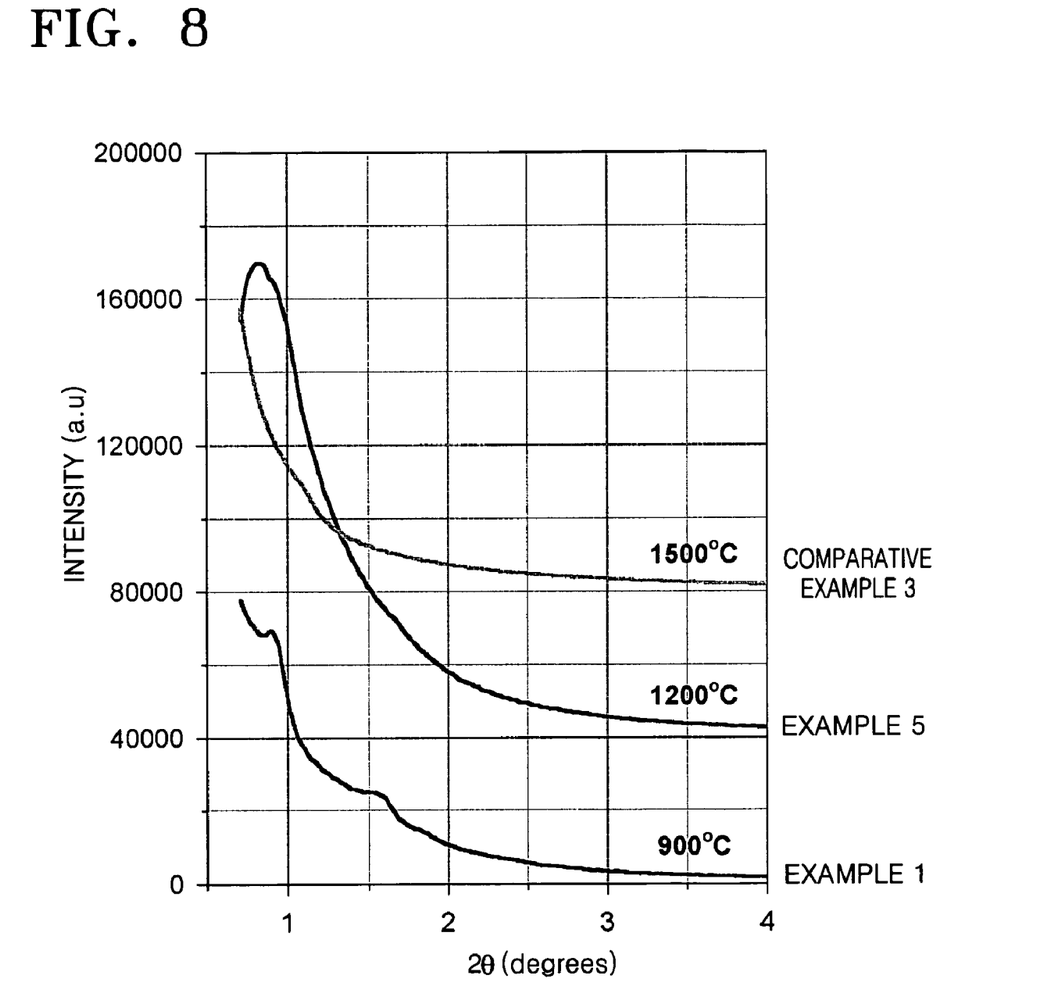
FIG. 8 is a graph illustrating the results of an X-ray diffraction analysis on mesoporous carbons prepared at various carbonization temperatures according to Examples 1 and 5 and Comparative Example 3.

FIG. 8 is a graph illustrating the results of an X-ray diffraction analysis on mesoporous carbons prepared at various carbonization temperatures according to Examples 1 and 5 and Comparative Example 3.

Referring to FIG. 8, as the carbonization temperature increases, the regularity of the finally obtained carbon decreases.

The surface area, the pore volume and the pore diameter of the mesoporous carbons of Example 1 and Comparative Example 1 are shown in Table 1.

TABLE 1

|  | Surface area ($m^2/g$) | Pore volume ($cm^3/g$) | Pore diameter (nm) |
| --- | --- | --- | --- |
| Example 1 | 1846 | 2.09 | 3.8 |
| Comparative Example 1 | 1835 | 2.18 | 3.8 |

As can be seen from Table 1, samples prepared in Example 1 and Comparative Example 1 have large surface areas and similar pore volumes, which corresponds to similar mesopores. Thus, the mesoporous carbons having these physical properties can be used as a support for catalysts of fuel cells or as an electrode material itself.

EXAMPLE 6

Manufacture of Supported Catalyst and Fuel Cell 0.5 g of the mesoporous carbon prepared in Example 1 was placed in a plastic bag. 0.9616 g of $H_2PtCl_6$ was dissolved in 1.5 ml of acetone and the solution was added to the plastic bag containing the mesoporous carbon.

The mixed solution was dried in air for four hours, moved to a melting pot, and then dried in a drying device at 60° C. overnight. Then, the melting pot was placed in an electric furnace where nitrogen flowed. Nitrogen was passed through for 10 minutes. Then, hydrogen was passed through while the temperature was increased from room temperature to 200° C. and then maintained at 200° C. for 2 hours so that a Pt salt impregnated in the mesoporous carbon was reduced. The gas flowing in the electric furnace was then replaced with nitrogen. The temperature was increased by 5° C./min to 350° C., maintained for 5 hours, and then slowly cooled to room temperature. Then, the result was impregnated with 0.9616 g of $H_2PtCl_6$ dissolved in 1.5 mL of acetone, and the reduction process was repeated. As a result, a supported catalyst in which the concentration of impregnated Pt was 60% by weight was obtained.

The supported catalyst was dispersed in a solution prepared by dispersing NAFION 115 (Dupont, Inc.) in isopropylalcohol, to form a slurry. The slurry was coated on a carbon electrode through a spraying process, and the concentration of the coated catalyst was 3 $mg/cm^2$ based on the amount of Pt. Then, the electrode was passed through a rolling machine to increase the adhesive force between the catalyst layer and the carbon electrode, thus forming a cathode.

An anode electrode was produced using a commonly available PtRu black catalyst. Then, a unit cell was produced using the cathode and the anode.

COMPARATIVE EXAMPLE 4

Manufacture of Supported Catalyst and Fuel Cell

A unit cell was produced using the supported catalyst prepared according to Comparative Example 1 in the same manner as in Example 6.

Performances of the unit cells were measured at 50° C. while 2M methanol and an excessive amount of air were supplied.

The fuel cell prepared in Example 6 exhibited higher efficiency than the fuel cell prepared in Comparative Example 4.

The method of preparing a mesoporous carbon according to an embodiment of the present invention can significantly reduce the carbonization time, compared to a conventional method using a heat treatment, by carbonizing a carbon precursor using microwave energy in a silica template.

The mesoporous carbon prepared according to this method can efficiently transfer electric energy due to good sheet resistance and can be used as a conductive material for electrodes for fuel cells. The mesoporous carbon may be used as a support for catalysts of electrodes, and a supported catalyst using the support can be used to manufacture a fuel cell having improved efficiency.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of preparing an ordered mesoporous carbon, the method comprising:

mixing a carbon precursor, an acid, and a solvent to obtain a carbon precursor mixture, wherein the carbon precursor is at least one material selected from the group consisting of carbohydrates, furfuryl alcohol, divinylbenzene, phenol-formaldehyde, resorcinol-formaldehyde, phenanthrene and anthracene;

impregnating an ordered mesoporous silica (OMS) with the carbon precursor mixture;

carbonizing the impregnated OMS at 800 to 1300° C. by irradiating the impregnated OMS with microwave energy with a power of 500 to 1180 W to form an OMS-carbon composite; and removing the mesoporous silica from the OMS-carbon composite, wherein the amount of the carbon precursor is 5-15 parts by weight based on 100 parts by weight of the carbon precursor mixture, the amount of the acid is 10-35 parts by weight based on 100 parts by weight of the carbon precursor mixture, and the amount of the solvent is 55-80 parts by weight based on 100 parts by weight of the carbon precursor mixture.

2. The method of claim 1, wherein the impregnated OMS is irradiated with microwave energy for 1-180 minutes.

3. The method of claim 1, wherein carbonizing the impregnated OMS is performed under a non-oxidizing atmosphere.

4. The method of claim 1, wherein the acid is at least one acid selected from the group consisting of sulfuric acid, nitric acid, phosphoric acid, and p-toluene sulfonic acid.

5. The method of claim 1, wherein the solvent is at least one material selected from the group consisting of water, acetone, methanol, ethanol, isopropylalcohol, n-propylalcohol, butanol, dimethylacetamide, dimethylformamide, dimethylsulfoxide. N-methyl-2-pyrrolidone, tetrahydrofuran, tetrabutylacetate, n-butylacetate, m-crezole, toluene, ethyleneglycol, γ-butyrolactone, and hexafluoroisopropanol (HFIP).

6. The method of claim 1, wherein the OMS has a cubic structure, a hexagonal structure or an irregular, three-dimensional structure.

7. The method of claim 1, wherein the OMS is MCM-48, SBA-1, SBA-15, KIT-1 or MSU-1.

8. The method of claim 1, further comprising heat-treating the impregnated OMS at a temperature of 50 to 250° C. before carbonizing the impregnated OMS.

9. The method of claim 1, wherein the impregnating of the OMS with the carbon precursor mixture is carried out by impregnating the OMS with a first portion of the carbon precursor mixture, heat-treating the OMS impregnated with the first portion of the carbon precursor mixture at a temperature of 50 to 250° C., and carrying out at least one additional cycle wherein the OMS is impregnated with at least one additional portion of the carbon precursor and than heat treated.

10. The method of claim 1, wherein the mesoporous silica is removed by dissolving the mesoporous silica with an aqueous HF solution or an aqueous NaOH solution.

11. A method of preparing an ordered mesoporous carbon the method comprising:

impregnating an ordered mesoporous silica (OMS) with a mixture comprising a carbon precursor, an acid and a solvent, wherein the carbon precursor is at least one material selected from the group consisting of carbohydrates, furfuryl alcohol, divinylbenzene, phenol-formaldehyde, resorcinol-formaldehyde, phenanthrene and anthracene;

carbonizing the impregnated OMS by irradiating the impregnated OMS with microwave energy with a power of 500 to 1180 W to form an OMS-carbon composite; and removing the mesoporous silica from the OMS-carbon composite, wherein the amount of the carbon precursor is 5-15 parts by weight based on 100 parts by weight of the carbon precursor mixture, the amount of the acid is 10-35 parts by weight based on 100 parts by weight of the carbon precursor mixture, and the amount of the solvent is 55-80 parts by weight based on 100 parts by weight of the carbon precursor mixture.

12. An ordered mesoporous carbon, prepared by the method of claim 1.

13. The mesoporous carbon of claim 12, which has an average diameter of mesopores of 2 to 10 nm, a specific surface area of 300 to 2000 $m^2/g$ and a sheet resistance of 20 to 200 $m\Omega/cm^2$ at a pressure of 75.4 $kg/cm^2$.

14. The mesoporous carbon of claim 12, a main peak appears in a range of 2θ (theta) between 0.5° and 2° at a CuK-α characteristic X-ray wavelength of 1.541 Å.

15. A supported catalyst comprising:

the ordered mesoporous carbon according to claim 12; and metal catalyst particles that are supported by the mesoporous carbon.

16. The supported catalyst of claim 15, wherein the amount of the metal catalyst particles impregnated in the supported catalyst is in the range of 40 to 80 parts by weight based on 100 parts by weight of the supported catalyst.

17. A fuel cell comprising:

a cathode;

an anode; and an electrolyte membrane interposed between the cathode and the anode, wherein at least one of the cathode and the anode contains an ordered mesoporous carbon made by the method of claim 1.

18. A fuel cell comprising:

a cathode;

an anode; and an electrolyte membrane interposed between the cathode and the anode, wherein at least one of the cathode and the anode contains the supported catalyst of claim 15.

19. A method of preparing an ordered mesoporous carbon, the method comprising:

mixing a carbon precursor, an acid, and a solvent to obtain a carbon precursor mixture, wherein the carbon precursor is at least one material selected from the group consisting of carbohydrates, furfuryl alcohol, divinylbenzene, phenol-formaldehyde, resorcinol-formaldehyde, phenanthrene and anthracene;

impregnating an ordered mesoporous silica (OMS) with the carbon precursor mixture;

carbonizing the impregnated OMS at 800 to 1300° C. by irradiating the impregnated OMS with microwave energy with a power of 500 to 1180 W to form an OMS-carbon composite; and removing the mesoporous silica from the OMS-carbon composite, wherein the amount of the acid may be in the range of 10 to 35 parts by weight based on 100 parts by weight of the entire carbon precursor mixture.

20. A method of preparing an ordered mesoporous carbon, the method comprising:

impregnating an ordered mesoporous silica (OMS) with a mixture comprising a carbon precursor, an acid and a solvent, wherein the carbon precursor is at least one material selected from the group consisting of carbohydrates, furfuryl alcohol, divinylbenzene, phenol-formaldehyde, resorcinol-formaldehyde, phenanthrene and anthracene;

carbonizing the impregnated OMS by irradiating the impregnated OMS with microwave energy with a power of 500 to 1180 W to form an OMS-carbon composite; and removing the mesoporous silica from the OMS-carbon composite, wherein the amount of the acid may be in the range of 10 to 35 parts by weight based on 100 parts by weight of the entire carbon precursor mixture.

* * * * *